US011626658B2

(12) United States Patent
DeLeon

(10) Patent No.: US 11,626,658 B2
(45) Date of Patent: Apr. 11, 2023

(54) MULTIPLE WIDEBAND OR BROADBAND ANTENNAS

(71) Applicant: Arthur Ray DeLeon, Fredericksburg, VA (US)

(72) Inventor: Arthur Ray DeLeon, Fredericksburg, VA (US)

( * ) Notice: Subject to any disclaimer, the term of this patent is extended or adjusted under 35 U.S.C. 154(b) by 3 days.

(21) Appl. No.: 17/379,380

(22) Filed: Jul. 19, 2021

(65) Prior Publication Data

US 2021/0351496 A1 Nov. 11, 2021

Related U.S. Application Data

(63) Continuation-in-part of application No. 16/501,460, filed on Apr. 29, 2017, now Pat. No. 11,095,047.

(51) Int. Cl.
| | | |
|---|---|---|
| *H01Q 21/30* | (2006.01) | |
| *H04B 1/69* | (2011.01) | |
| *H01Q 1/28* | (2006.01) | |
| *H04L 5/00* | (2006.01) | |
| *H04B 7/185* | (2006.01) | |
| *H04L 27/26* | (2006.01) | |
| *H01Q 9/42* | (2006.01) | |

(52) U.S. Cl.
CPC .............. *H01Q 1/28* (2013.01); *H01Q 9/42* (2013.01); *H01Q 21/30* (2013.01); *H04B 1/69* (2013.01); *H04B 7/18504* (2013.01); *H04L 5/0064* (2013.01); *H04L 27/2666* (2013.01)

(58) Field of Classification Search
CPC ............ H01Q 1/28; H01Q 9/42; H01Q 21/30; H01Q 1/246; H04B 1/69; H04B 3/52; H04B 1/713; H04L 5/0064; H04L 27/2666; H04L 5/003
See application file for complete search history.

(56) References Cited

U.S. PATENT DOCUMENTS

| | | | |
|---|---|---|---|
| 6,781,968 B1 * | 8/2004 | Colella .............. | H04B 7/18504 342/356 |
| 2016/0156406 A1 * | 6/2016 | Frolov ............... | H04B 7/18504 455/431 |
| 2019/0037350 A1 * | 1/2019 | Prevatt ..................... | G01S 3/74 |

* cited by examiner

*Primary Examiner* — Michael C Zarroli
(74) *Attorney, Agent, or Firm* — Dale J. Ream

(57) ABSTRACT

A multiple wideband antenna or broadband antenna using the concepts of cellular clusters integrated into a dual polarity antenna panel. These panels integrate a free space optic capability to transmit and receive high-bandwidth communications and provide an option for communication transport of information from the base of the tower to the antenna. This antenna also integrates the capability to provide command and control using the cellular guard bands created between each cellular block to support Unmanned Aerial Systems or free space optics connection.

1 Claim, 4 Drawing Sheets

MULTIPLE WIDEBAND OR BROADBAND ANTENNAS

REFERENCE TO RELATED APPLICATIONS

This application is a continuation-in-part and claims the benefit of application Ser. No. 16/501,460, filed Apr. 29, 2017, titled Multiple Wideband or Broadband Antennas, which claims the benefit of Application Ser. No. 62/391,524, filed May 3, 2016, titled Multiple Wideband or Broadband Antennas which is incorporated in its entirety herein.

BACKGROUND OF INVENTION

This invention relates generally to antennas and, more particularly, to the antenna design uses of cellular layout with frequency reuse schemes to integrate multiple wideband capable panel antennas to connect and allow commercial or military communications to operate over multiple bands seamlessly. Integrating optical receiving capabilities into the antenna in the future will allow for the exchange of high-bandwidth capabilities. The concepts are based upon the application of cellular networks and the typical cellular grid design applied to the antenna with integrated frequency reuse capabilities. The concepts are based on cell clusters and the mathematical equation typically designed for frequency reuse to eliminate the carrier-to-co-channel interference. Integrated software for the antennas will allow and recommend the optimal pointing of the antenna based on the latitude and longitude of the antenna placement. Frequency planning and co-site interference was the leading element in this antenna design and to make more efficient use of the spectrum resource. Additionally, the antenna design described below integrates the concepts of sectoring typically built into the hexagon designs of planning cellular towers to increase the number of channels available to a communication system.

SUMMARY OF THE INVENTION

A multiple wideband or broadband antenna according to the present invention includes a cellular grid design arranged as clusters having sectored frequencies associated with a plurality of cell towers, said cellular grid design including broadband cellular telephony having a plurality of frequency bands. The antenna includes free space optics for making possible high bandwidth communications using multiple frequencies.

Therefore, a general object of the present invention is to provide a multiple band antenna for use in a cellular layout with frequency reuse schemes that integrate multiple wideband capable panel antennas to connect and that allows commercial or military communications to operate over multiple bands seamlessly.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

Several elements of the antenna are not displayed including the many deployment methods like jersey walls along highways, different patterns besides the sphere shown in the graphic, future integrated asphalt communications to vehicles, and is realized when a complete enterprise system is used based on the various views and wherein.

DESCRIPTION OF THE PREFERRED EMBODIMENT

Figure 1:
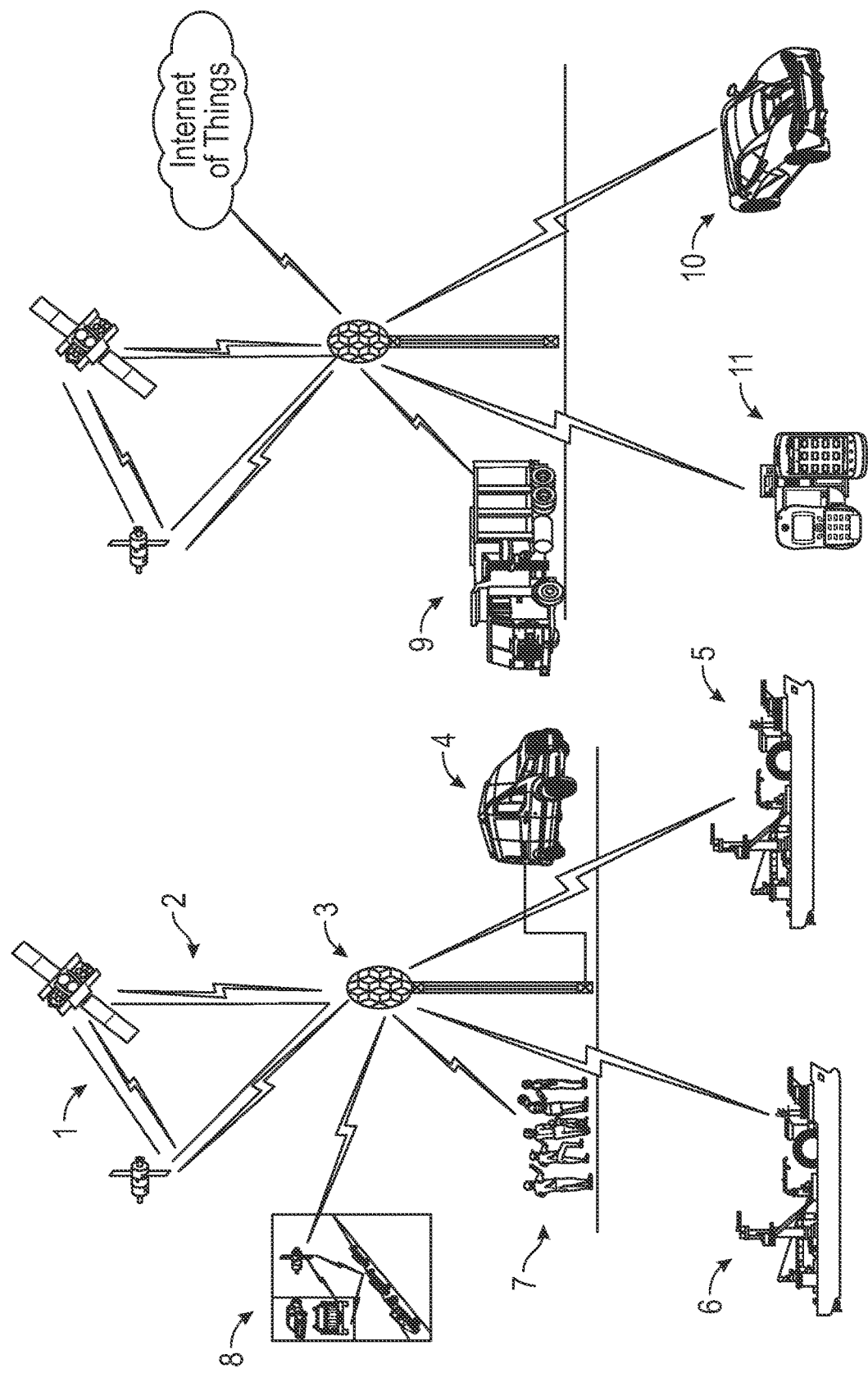
FIG. 1 is a graphic depiction of the methods of employment and use of the antenna. The left side provides military employment methods, and the right side is commercial.

A multiple wideband or broadband antenna according to preferred embodiments of the present invention will now be described in detail with reference to FIGS. 1 to 6 of the accompanying drawings. The level of skill known to persons of ordinary skill in the art of antennas, cellular grids, and clustering is high.

A preferred example of the present invention is combining with cellular technology within military communications systems to provide the ability for the U.S. military to build a highly robust architecture integrating security and agility into their networks. Military communications systems must be designed to meet todays and future global spectrum requirements, and they must have integrated security and frequency band hopping capabilities like cell phones today (i.e., the cellular grid). Integrated security is tied to the zero trust models and frequency hopping establishes a frequency hop pattern hard coded into a cellular architecture to minimize the ability for information to be captured. Preferably, the multiple frequency bands include 5 MHz, 10 MHz, or 20 MHz blocks.

A frequency is the apportionment or assignment given to an organization. Emission bandwidth determines how much information can be sent over an assigned frequency. For example, 25 KHz was used to transmit or receive (transceiver) voice where today's digital technology can compress music, text, streaming video over 5 MHz emission bandwidth.

The integrated security and frequency band hopping capabilities will be applied to unmanned aerial systems in addition to using the cellular block guard bands to communicate. This will allow the mitigation or minimization of unused bandwidth without interfering with other communication capabilities. Frequency-hopping spread spectrum (FHSS) is a method of transmitting radio signals by rapidly changing the carrier frequency among many distinct frequencies occupying a large spectral band. The changes are controlled by a code known to both transmitter and receiver.

The multi-band antenna is the key factor to providing a capable multi-band system able to support military operations. Integrating the concepts used in today's cellular spectrum re-use design provides the ability to expand military utility significantly. The use of cell layout schemes allows multiple wide-band capable panel antennas to connect and allows military communications over multiple bands seamlessly. Integrating optical transceiver capabilities into the antenna in the future will allow UAS download of imagery and several other key capabilities used by the military. Software may be included for ensuring the cellular frequencies do not interfere with those of an adjacent tower or co-site antenna.

The antenna will also integrate the ability to transmit and receive communications from satellite communication from the free space optic's component or the radio frequency component of a satellite footprint. This will allow for seamless transition of communication systems from unmanned systems, robotics, and unmanned systems for command and control or surrogate satellite capabilities.

Additionally, the use of a multi-band antenna provides methods to share a finite frequency resource among many commercial, federal government, and military communication capabilities minimizing spectrum at rest, based on the hundred-year history of discrete frequency assignments process.

FIG. 1 illustrates a method that includes the methods of deployment and FIGS. 1 through 6 illustrate the antenna's frequency reuse components, multiple wide-band, broadband, and free space optic's capabilities. Free-space optical communication (FSO) is an optical communication technology that uses light propagating in free space to wirelessly transmit data for telecommunications or computer networking. "Free space" means air, outer space, vacuum, or something similar. This contrasts with using solids such as optical fiber cable. Reference numeral 1 illustrates the ability to integrate free space optics into the antenna and reference numeral 2 illustrates radio frequency components of the architecture.

It is understood that the antenna and cellular grid described above may include cellular bandwidth protocols for command and control, imagery and data communications.

Reference numeral 3 illustrates a tactical method of employment scaling the size of antenna panels based on the need for it and the degree to which the tactical free space optics will provide rapid base station connections. Reference numeral 4 illustrates an application of the mobile configuration and fiber optic or cable connections. Reference numeral 5 illustrates the ability to use a ship's super structure to strategically place antenna panels and reference numeral 6 illustrates a method to add a scalable spear or three-dimensional shape that provides a 360-degree panel that is operative to deploy scalable antenna capabilities. Reference numeral 7 establishes a scalable capability that allows tactical ground force the freedom of movement with secure cellular like capabilities. Reference numeral 8 integrates ground communication unmanned system swarming, Explosive Ordinance Disposal (EOD) robotics into the configuration. There are several commercial applications that are illustrated in this figure and the antenna provides secure communication to delivery robotics as shown at reference numeral 9, autonomous vehicle communications 10, and cellular devices 11.

More particularly and at a basic level, a drone swarm is a floating dynamic wireless network, commonly known as a wireless mesh network. Effective communication mechanisms are a key requirement for drone swarms and their meaningful deployment. Swarm with a large size requires a fully distributed communication system which scales well and optimizes the "many-to-many" communication.

With more particular explanation of an EOD, in military, law enforcement and first responder applications, EOD's are widely deployed for improvised explosive device (IED) and explosive ordnance disposal (EOD), reconnaissance, communications, CBRN (Chemical, Biological, Radiological, Nuclear), HAZMAT, security, heavy lift, defense and rescue missions.

Figures 2, 3, 4:
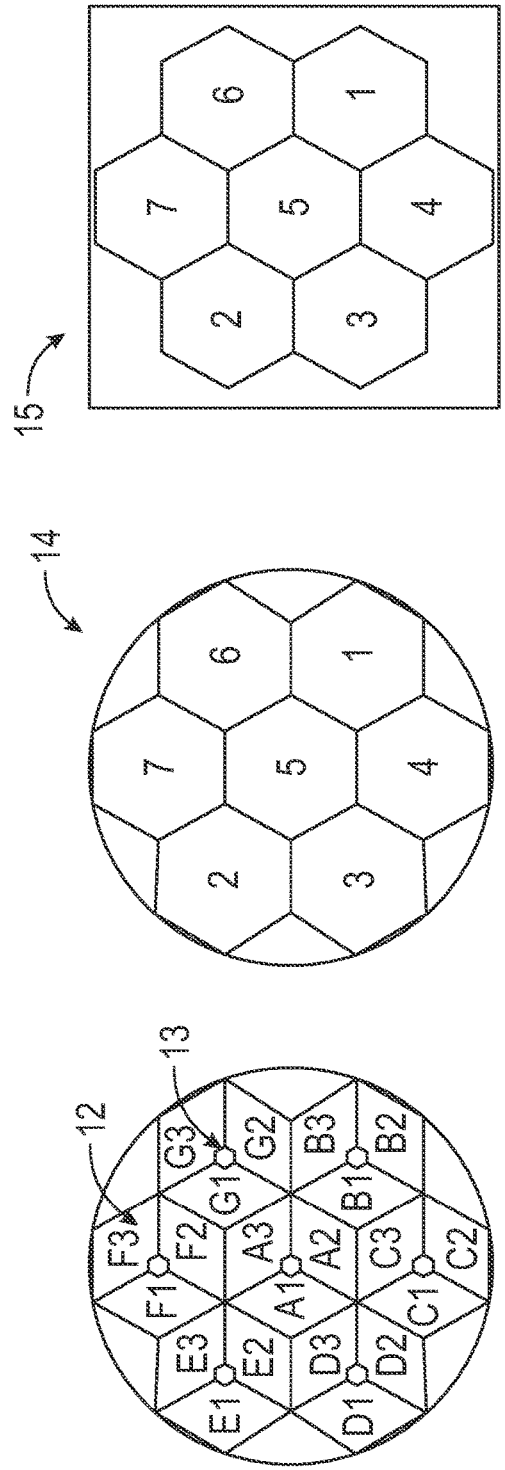
FIG. 2 is a graphic representation of how the antenna will use cellular clusters to integrate multiple wide-band antennas exploiting frequency reuse and provides integrated free space optics transmit and receive capabilities.
FIG. 3 is a table provided to represent how frequencies would be distributed on the antenna.
FIG. 4 is a table provided to represent how frequencies would be distributed on the antenna as a cluster of seven without the integrated optical component. As described in many telecommunications readings cluster can be applied in several different sizes.

FIG. 2 illustrates a graphic of the cluster concepts 12 integrated into antenna panels and frequency reuse components to increase current bandwidths. Reference numeral 13 illustrates integrating the ability to add free space optics into each hexagon cellular panel for gigabit or larger bandwidths. Reference numeral 14 illustrates a 7-cluster system into a sphere or a 15 7-cluster capability into a highway jersey wall or home highway dividing walls. In other words, antennas may be clustered together to allow for increased bands or bandwidth.

In a computer network or computer context, a cluster or clusters usually designates a number of networked computers that can be seen from the outside in many cases than a computer. The aim of the "clustering" is mostly in the increase in computing capacity or availability to a single computer. In a military context, cluster munitions are a form of air-dropped or ground-launched explosive weapons that eject numerous smaller submunitions. These weapons have military value, because of their wide dispersal, versatility and effectiveness against targets that move or do not have precise locations, such as moving troops or vehicles With regard to FIG. 3-4, reference numeral 16 illustrates the distribution of duplex pairing frequencies in 5 MHz steps. Reference numeral 17 provides a duplex pairing frequency assignment's layout for a 7-cluster system.

Figure 5:
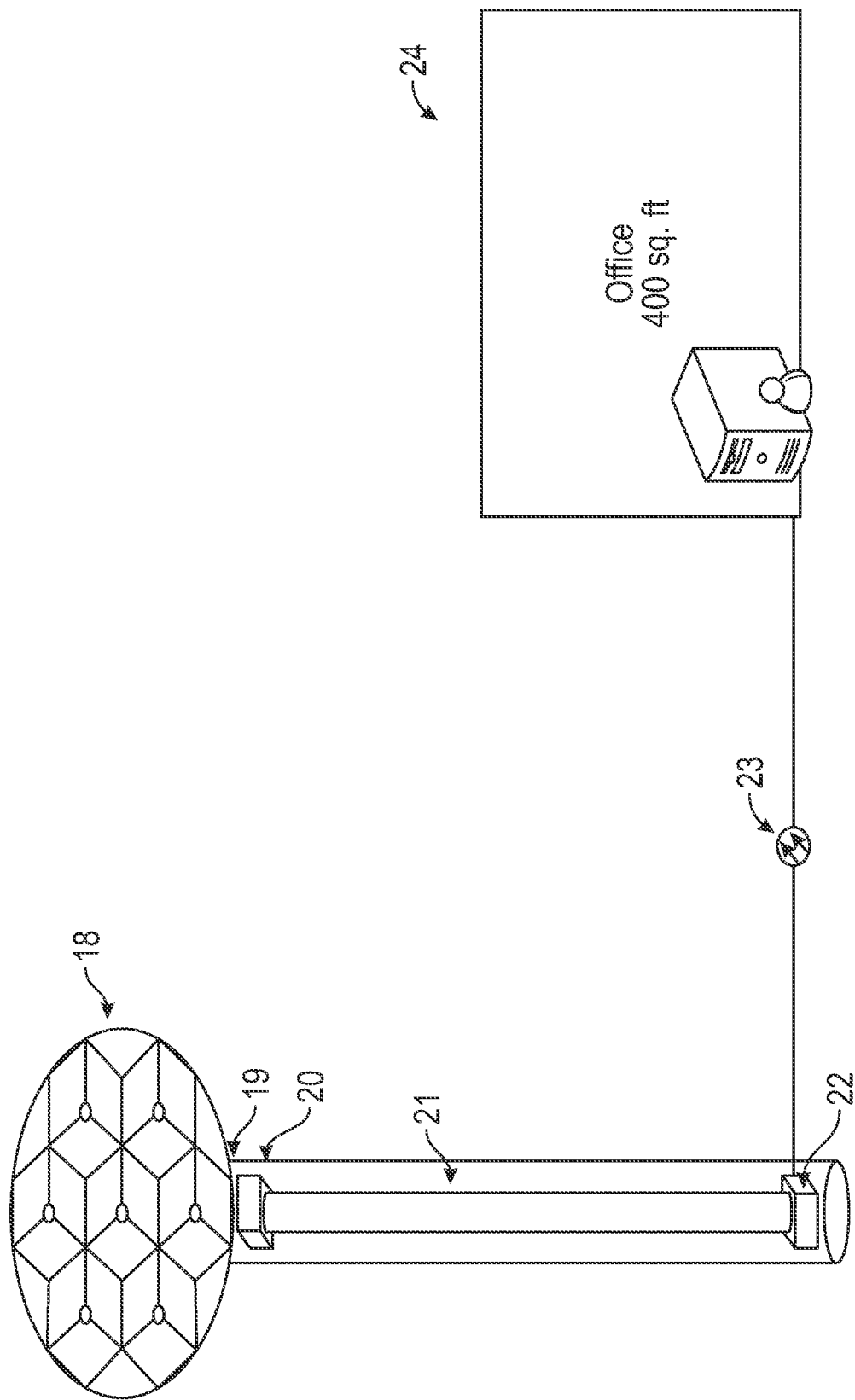
FIG. 5 is a graphic depiction of the free space optics as an alternative of running cables and can be installed internal or externally to the tower.
Figure 6:
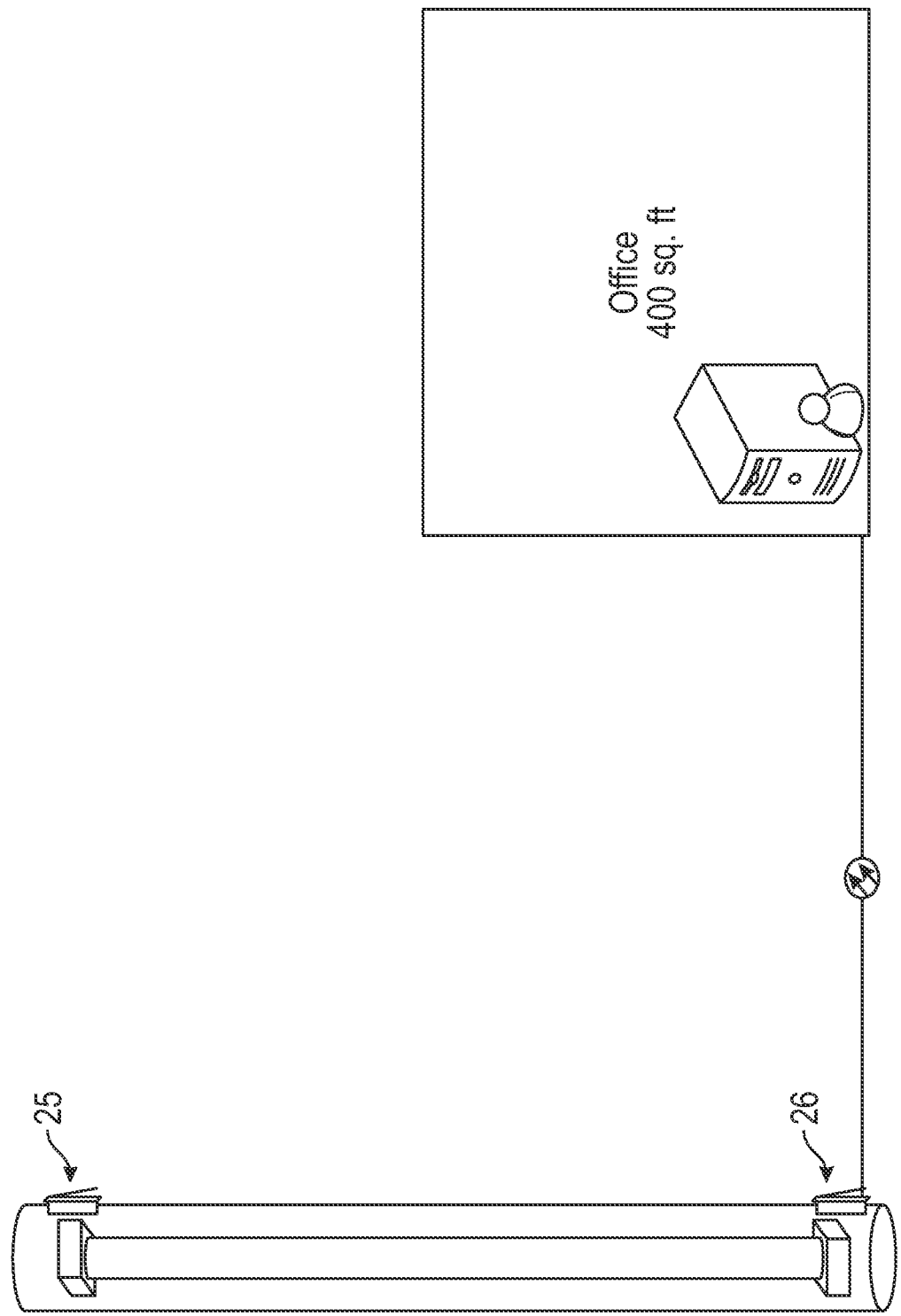
FIG. 6 is a graphic depiction of the internal free space optics internal to the tower and the access panels to conduct maintenance, troubleshoot, or configure antenna panels.

With regard to FIG. 5-6, the tower illustrates spheres 18 as a method of employment; however, can be applied to several three-dimensional shapes and use software to rotate for fine-tuning the antenna panels based on software assist. The length of the tower illustrates the integration of the free space optics 20, 21, 22 internally to the tower and can also be deployed externally to the tower eliminating the overuse of cabling. The fiber optic cable 23 provides the connection to communications racks or base stations located inside communication building 24. Access panels 25, 26 are needed to ensure maintenance, configuration, and required repairs can be made to the optics.

It is understood that while certain forms of this invention have been illustrated and described, it is not limited thereto except insofar as such limitations are included in the following claims and allowable functional equivalents thereof.

I claim:

1. A multiple wideband or broadband antenna for transmitting and receiving communications from satellite communications, comprising:
   a cellular grid arranged in at least one cluster and having a plurality of sectored frequencies that are distributed to cell towers and includes broadband cellular telephony using multiple frequency bands;
   wherein said multiple frequency bands include 5 MHz, 10 MHz, or 20 MHz blocks;
   free space optics for high band-width communication;
   an unmanned aerial system configured to use cellular frequency block guard bands without causing interference and eliminating unused frequencies, each said unmanned aerial system configured to frequency hop through each guard band for efficiencies and to integrate command and control with data into a same signal.

* * * * *